Sept. 5, 1967  H. R. FIFER  3,339,518
LUBRICATION AND WARNING SYSTEM FOR RAILROAD JOURNAL BEARINGS
Filed Dec. 28, 1964
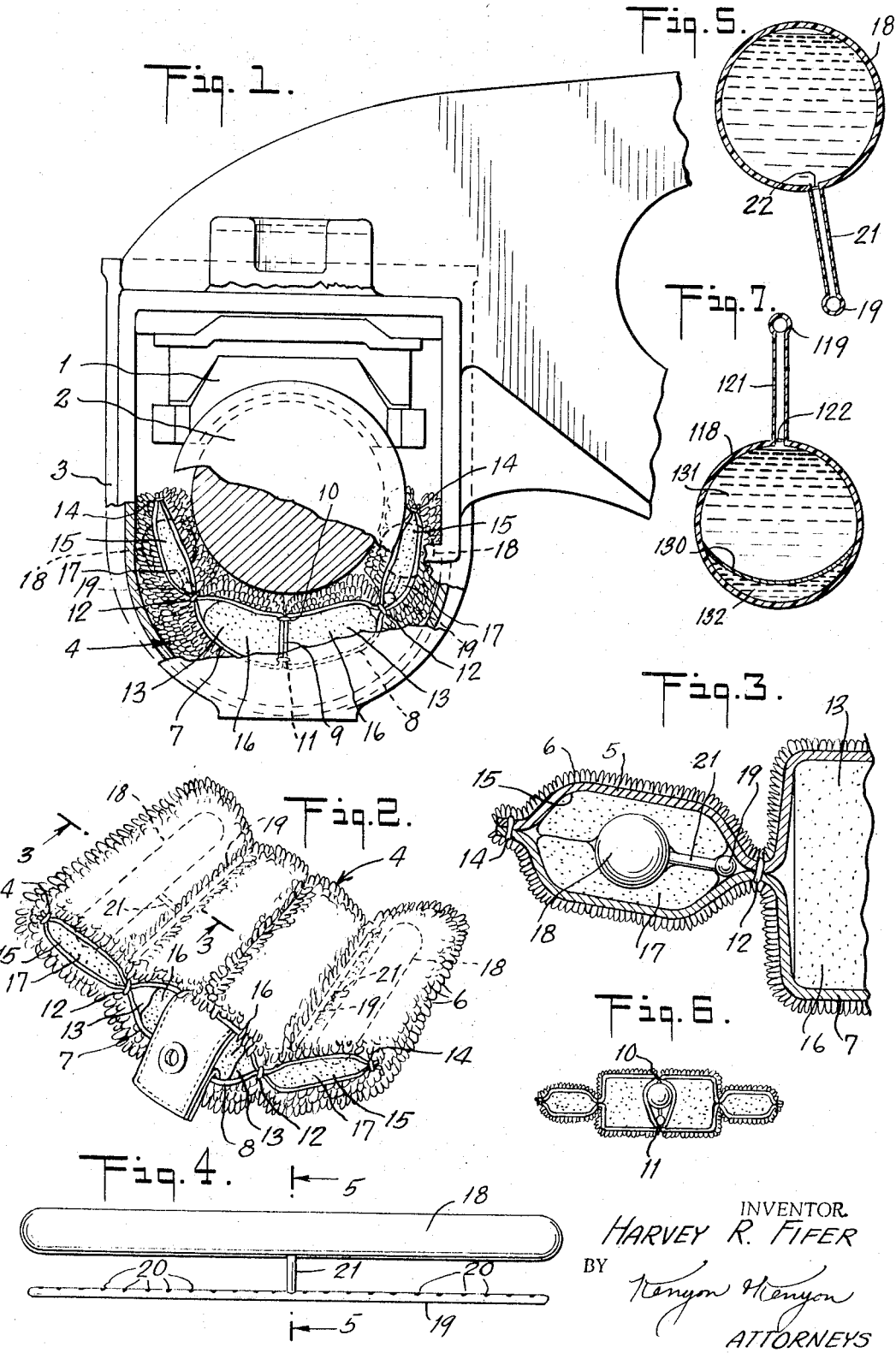
INVENTOR.
HARVEY R. FIFER
BY
Kenyon & Kenyon
ATTORNEYS

United States Patent Office 3,339,518
Patented Sept. 5, 1967

---

3,339,518
LUBRICATION AND WARNING SYSTEM FOR RAILROAD JOURNAL BEARINGS
Harvey R. Fifer, New York, N.Y., assignor to The Journapak Corporation, New York, N.Y., a corporation of New York
Filed Dec. 28, 1964, Ser. No. 421,547
9 Claims. (Cl. 116—114.5)

This invention relates to an improved lubrication and warning system for use in railroad journal bearings to warn of overheating, thus permitting remedial action and preventing permanent damage to the bearings and to the journal.

Generally, journal bearing failure in railroad cars is preceded by a substantial increase in temperature. The normal operating temperature of the bearing is about 100° F. above the ambient temperature and if the bearing temperature rises to somewhere between 250° and 300° F. depending upon the bearing design and other factors, there will almost always be a complete failure.

Generally, the overheating which precedes a hot-box is difficult to detect because it is not until the overheating has become serious that there are external indications of overheating or indications observable to an inspector.

One of the objects of this invention it to make it possible to warn inspectors and operating personnel of overheating which may lead to real damage and to permit remedial action to be taken before serious consequences come of the initial overheating or before the cause of the overheating has had an opportunity to create serious permanent damage.

This object is achieved by providing indicating and lubricating means which are incorporated in the lubricating pads which are commonly used in railroad car journal boxes to assure application of lubrication to the journals. In the preferred form of the invention, there is incorporated in this pad indicator and lubricating means which comprise a distributor and a container connected by a pressure rupturable seal. The container is filled with high quality lubricant and warning material and a liquid which will be converted to a gaseous phase when predetermined temperatures are reached which are above normal operating temperatures for the bearing, but below those at which permanent damage might be sustained.

In the preferred form of this invention, the warning material is a dye which is released and colors the inside of the journal and everything there present so that an inspector on opening the lid of the box will be aware that overheating has occurred which may lead to serious damage unless corrected.

With this arrangement, it is possible to make inspection personnel aware of conditions leading to serious overheating which would not be easily discerned and it is possible to thus remove cars from a train at a terminal point before serious hot-box troubles develop between points.

It is also contemplated within this invention to provide additional warning material adapted to give a signal external of the journal box. It is contemplated that such material be employed in combination with a liquid material which becomes gaseous at a higher temperature than that associated with the dye. It is thus possible by incorporating both warning systems, in the pad, to give a preventative protective warning easily discernible at inspection points and to provide a visible warning when a greater heat develops.

Among the objects of the invention are to incorporate the lubricating and warning means in the pad so that these means will be fully and adequately protected during handling and prior to installation.

Other objects are to provide such means which are positive in action in that they will distribute the lubricating medium and the warning material under pressure so as to assure full and complete application in case of temperature rises within the contemplated ranges.

Other objects and advantages of the invention will appear in the following specification which describes forms of the invention which are at present preferred and which are illustrated in the accompanying drawings.

It will be understood, however, that the forms of invention described and shown is illustrative of the invention and that it need not be of the exact forms described and shown.

In the drawings,

FIG. 1 is a view partly in section showing one form of the invention in place in the journal box of a railroad car.

FIG. 2 is a perspective view of a lubricating pad incorporating the invention.

FIG. 3 is a detailed sectional view taken on the line 3—3 of FIG. 2.

FIG. 4 is an elevational view of the means employed to distribute lubrication and warning medium.

FIG. 5 is a detailed sectional view taken on the line 5—5 of FIG. 4.

FIG. 6 is a sectional view showing a different form of pad embodying the invention, and FIG. 7 is a detailed sectional view showing a different form of means for distributing the lubrication and warning medium.

The invention is shown in the drawings applied to a conventional railroad car journal bearing. The bearing is shown at 1, the journal at 2 and the box or housing at 3.

Within the housing 3 there is disposed a lubricating pad 4 which, as shown here, comprises cotton tufted duck made up of a duck base 5 and looped absorbent cotton yarn 6 or the like which serves to absorb and wick the oil and apply it directly to the journal.

The pad shown in FIG. 1 is made up of two pieces of tufted duck 7 and 8 which are disposed at 9 with their tufted faces in contact. Lines of stitching 10 and 11 join them and each piece is stitched at 12 to form pockets 13 and is stitched again at 14 to form pocketed wing pad portions 15.

Within each of the pockets 13 is disposed a suitable foam pad 16 made of a suitable oil resistant elastomer such as neoprene or acrilonitrile foam. These pads serve to hold the wicking or loops 6 directly in contact with the journal 2 to apply lubrication which has been introduced into the box or casing 3 and is wicked up to the journal in conventional manner.

Each of the wing pad portions 15 is also provided with similar foam material 17.

In use, the wing pad portions 15 which are hinged to the center portion of the pad by the lines of stitching 12 are adapted, as shown in FIG. 1, to be placed against the sides of the journal to carry lubrication up to the journal.

Within each of the wing pad portions 15 there is disposed means for holding lubricating and warning material to be released on overheating of the bearing. These means consist of a reservoir 18 which, in the preferred form of the invention, is of elongated and cylindrical form and a distributor 19 of elongated tubular form having a plurality of holes 20 disposed therealong and a connecting conduit 21 for conducting fluid from the reservoir 18 to the distributor 19.

Within the conduit 21 is a pressure rupturable seal or disk 22. Such a disk may be made of any suitable metal such as titanium alloys where its resistance to pressure is predetermined by thickness as is well known.

Within each of the containers 18 there is provided a supply of a suitable lubricant in liquid form which should be selected to give the finest lubrication under conditions of bearing failure. Such lubricating liquids are well known and any suitable one can be employed.

Also enclosed within the container 18 is a liquid adapted to turn to gas upon the attainment of a temperature above that of the normal operating temperature for bearings. In general, the journal bearings involved here operate at temperatures about 100° F. above the ambient temperature and the liquid should be selected so that its boiling point lies above this temperature. Generally speaking a temperature of above 220° F. would provide adequate safety conditions since the liquid would not then become gaseous under any normal operating condition.

The liquid, however, should have a boiling point such that it will turn to its gaseous phase at a temperature above the normal operating temperature of the bearings, but below that reported by overheating of the bearing which may lead to bearing failure.

In general, when bearings of the type involved here attain temperatures of from 250° F. to 300° F., depending upon the particular bearing and its design, failure will quite probably ensue. It is thus desirable to have the boiling point of the liquid fall below the range of 250° F. to 300° F. depending to some extent upon the bearing.

A warning material is also incorporated in the liquid in the reservoir 18. This warning material may be merely a suitable dye for dyeing the pad and the inner portions of the box upon release of the material from the container through the distributor. A suitable dye for this purpose is an alizarin dye.

When such dye is employed, it is desirable to select the pressure exerting liquid as one having a boiling point well below 250° F. so that when the bearing is heated to this temperature pressure exerted by the liquid will break the sealing disk and release the dye in the journal box.

With this arrangement, it is possible for inspection personnel at terminal points to determine whether any bearings have been running above the normal temperature merely by opening the lid of the journal box. The presence of the dye on the pad and the inside of the box will warn personnel that overheating is occurring so that cars with offending bearings may be set aside for remedial action well before failure.

The warning material may be any suitable liquid which will, at the temperature of release, form smoke clouds or give off a distinctive odor external of the box itself, making it easy for the inspection personnel to spot an overheating bearing either at the terminal point or enroute.

In the warning material above mentioned for giving external signal, it may include butyl mercaptans or similar materials.

In the preferred form of the invention, as shown in FIG. 1 where there are two warning and lubricating means, one will be provided with dye as the warning medium and the other with a warning medium adapted to give off smoke or odor which is discernible externally of the journal box. In this case, the liquid which turns to gas and thus disrupts the seal between the container and the distributor used with the dye will have a lower boiling point than the liquid used in the other warning member with the other warning material so that on first overheating the dye will be released and the other warning material will not be released from the other reservoir until a higher temperature has been reached.

The method employed to vaporize and rupture the seal can be selected from various alcohol water systems, ethylene glycol carbon tetrachloride systems and various hydrocarbon systems.

The warning devices in the wing pad portions 15 are protected by the tufted duck and by the foam inserts so that they are not liable to damage during shipping, storing, handling or insertion of the pads.

The warning devices comprising the container 18, distributor 19 and connecting tubes 21 may be made of any suitable material. Certain metals will be satisfactory and even certain plastics which are relatively inert and which are not rigid will also serve the purpose.

In operation, the pad is inserted under the journal as shown in FIG. 1. Ordinary lubrication is applied. If the bearing begins to run hotter than normal the pressure exerting liquid will turn to its vapor phase and will rupture the disk 22. This permits the lubricant and the warning material to flow into the pad where it is distributed for the length thereof by the distributor 19. It may be that the additional lubricant will resolve the heating problem, but in any event, when dye is used as the warning medium, the inspection personnel at terminal point will easily determine that overheating has taken place. This will give opportunity for remedial steps to be taken and there will not be the complications involved when a hot-box necessitates the stopping of a train between terminal points for removal of a car. Furthermore, serious damage to the journals may be easily prevented.

Of course, when a warning material is used which gives signals externally of the journal box, the warning will be apparent even without inspection by opening the lid of the journal box.

In FIG. 6 there is shown a form of invention in which a single warning device is employed. In this case, the warning device with its container 18 and distributor 19 is inserted between the portions 11 of the tufted disk material. In this case, the warning device is extremely well protected because of its relationship to the tufted disk material and the foam pads.

In this case, the wings do not have warning devices therein.

In certain instances, it may be desirable to assure forced expulsion of the lubricant and warning material. A warning mechanism to serve this purpose is shown in FIG. 7. The reservoir 118 is there connected to a distributor tube 119 by means of a conduit 121. The rupturable seal 122 is disposed as in the form of device shown in FIGS. 4 and 5 except that a diaphragm 130 is disposed across the reservoir 118 being secured at all of its edges to form two separate compartments. The lubricant and warning material indicated at 131 are disposed on one side of the flexible diaphragm 130 and the liquid to be converted to gas by overheating indicated at 132 is placed on the other side of the diaphragm. With such a device, when overheating occurs, the liquid 132 explodes into its gaseous phase exerting pressure on the diaphragm. This in turn exerts pressure on the seal 122 to rupture it. Thereafter, continued expansion or evaporation of the liquid 132 will move the diaphragm 130 to forceably expel the lubricant and warning material 131 from the reservoir 118 through connection 131 to the distributor 119.

The present invention may be embodied in other specific forms without departing from the spirit or the essential attributes thereof. It is, therefore, desired that the embodiments shown and described above be considered in all respects as illustrative and not restrictive, reference being had to the appended claims rather than to the foregoing description to indicate the scope of the invention.

What is claimed is:
1. In a lubricating and warning device for railroad journal bearings or the like the combination of a pad assembly of wicking material comprising a central pad portion for disposition beneath a journal and adapted to contact said journal, a pair of wing pad portions extending laterally from said central pad portion and adapted to partially wrap around said journal, and means for emergency lubrication and warning disposed within each of said wing pad portions, said means comprising a distributor member, a container carrying a lubricant, warning material and a liquid for conversion to gas on the application of heat to said container, a conduit in fluid communication with said distributor member and container, and a pressure rupturable seal in said conduit to confine fluid in said container.

2. A lubricating and warning device according to claim 1 in which there is disposed in each container a lubricant, a warning material and a liquid convertible to gas by application of heat at a temperature above that encountered in said journal bearing during normal operation, but below that at which the bearing and journal would be damaged by overheating whereby overheating of the bearing will increase pressure in the container and rupture said rupturable seal.

3. A lubricating and warning device according to claim 2 in which the warning material is a dye for dyeing the pad portion to indicate to an inspector that there has been overheating and that the material from the container has been dispensed.

4. A lubricating and warning device according to claim 2 in which the warning material in one of the containers is a dye and in which the warning material in the other container is adapted to give a signal externally of the journal box and in which the liquid convertible to gas in one container converts to its gaseous phase at a temperature lower than that in the other container.

5. In a lubricating and warning device for railroad journal bearings a pad of wicking material adapted to be disposed adjacent said journal and to contact said journal, said pad having disposed therein means for emergency lubrication and warning including a distributor member and a container carrying a lubricant, warning material and a liquid convertible to gas on the application of heat to said container, and having a conduit in fluid communication with said distributor member and a pressure rupturable seal in said conduit to confine fluid in said container.

6. A lubricating and warning device according to claim 5 in which there is disposed in said container a lubricant, a warning material and a liquid convertible to gas by application of heat at a temperature above that encountered in said journal bearing during normal operation, but below that at which the bearing and journal would be damaged by overheating whereby overheating of the bearing will increase pressure in the container and rupture said rupturable seal.

7. A lubricating and warning device according to claim 6 in which the warning material is a dye for dyeing the pad to indicate to an inspector that the material from the container has been dispensed.

8. In a lubricating and warning device for railroad journal bearings or the like the combination of a pad assembly of wicking material comprising a central pad portion for disposition beneath a journal and adapted to contact said journal and a pair of wing pad portions extending laterally from said central pad portion and adapted to partially wrap around said journal, and means for emergency lubrication and warning disposed within each of said wing pad portions, said means comprising an elongated distributor tube disposed longitudinally within each wing pad portion so as to lie longitudinally of the journal when the device is in place and having a plurality of apertures disposed therealong, and an elongated container adapted to carry lubricant and warning material extending parallel to said distributor tube and thereabove when the device is in place, a conduit in fluid communication with said container and said distributor tube and having a pressure rupturable seal therein to confine fluid in said container.

9. A lubricating and warning device according to claim 8 in which there is disposed in each contanier a lubricant, a warning material and a liquid convertible to gas by application of heat at a temperature above that encountered in said journal bearing during normal operation, but below that at which the bearing and journal would be damaged by overheating whereby overheating of the bearing will increase pressure in the container and rupture said rupturable seal.

No references cited.

LOUIS J. CAPOSI, *Primary Examiner.*